United States Patent
Nadal et al.

(10) Patent No.: US 10,396,847 B2
(45) Date of Patent: Aug. 27, 2019

(54) RECEIVER ARCHITECTURE FOR LINEAR MODULATION BASED COMMUNICATION SYSTEMS

(71) Applicant: INSTITUT MINES-TELECOM/TELECOM BRETAGNE, Brest (FR)

(72) Inventors: Jérémy Nadal, Brest (FR); Charbel Abdel Nour, Brest (FR); Amer Baghdadi, Brest (FR)

(73) Assignee: INSTITUT MINES-TELECOM / TELECOM BRETAGNE, Brest (FR)

( * ) Notice: Subject to any disclaimer, the term of this patent is extended or adjusted under 35 U.S.C. 154(b) by 0 days.

(21) Appl. No.: 15/620,208

(22) Filed: Jun. 12, 2017

(65) Prior Publication Data
US 2017/0366222 A1 Dec. 21, 2017

(30) Foreign Application Priority Data
Jun. 21, 2016 (EP) .................. 16305752

(51) Int. Cl.
*H04B 1/71* (2011.01)
*H04L 27/26* (2006.01)

(52) U.S. Cl.
CPC ......... *H04B 1/7102* (2013.01); *H04L 27/265* (2013.01); *H04L 27/2623* (2013.01); *H04L 27/2698* (2013.01); *H04B 2201/709718* (2013.01)

(58) Field of Classification Search
CPC . H04L 27/264; H04L 27/2698; H04L 27/265; H04L 27/2636; H04B 1/7102; H04B 2201/709718
USPC ........................................... 375/148
See application file for complete search history.

(56) References Cited

U.S. PATENT DOCUMENTS

| | | | | |
|---|---|---|---|---|
| 2011/0182332 A1* | 7/2011 | Ericson | ............... | H04L 5/0044 375/219 |
| 2014/0286384 A1* | 9/2014 | Mestre Pons | ........... | H04L 27/01 375/232 |
| 2016/0301554 A1* | 10/2016 | Dore | ........................ | H04B 1/16 |

OTHER PUBLICATIONS

D. Pinchon, P. Siohan, and C. Siclet, "Design techniques for orthogonal Modulated filterbanks based on a compact representation," IEEE Transactions on Signal Processing, vol. 52, No. 6, pp. 1682-1692, Jun. 2004.
B. le Floch, M. Alard, C. Berrou. in "Coded orthogonal frequency division multiplex". Proceedings of the IEEE, vol. 83, pp. 982-996, Jun. 1995.

(Continued)

*Primary Examiner* — Leila Malek
(74) *Attorney, Agent, or Firm* — Meagher Emanuel Laks Goldberg & Liao, LLP

(57) ABSTRACT

A receiver for Filter Bank Multicarrier frequency spread signals such as FBMC, FBMC/OQAM, OFDM, comprises a linear phase rotation module adapted to introduce a linear phase rotation to a received time domain signal, a discrete Fourier transform and a Finite Impulse response digital filter. The coefficients of the digital filter define a shift of the frequency response of the prototype filter of the receiver, and the coefficients of the digital filter are fixed so as to compensate the linear phase rotation introduced by the filter. The frequency shift introduced may be equal to the reciprocal of a power of two of the modulation sub carrier spacing.

13 Claims, 7 Drawing Sheets

(56) References Cited

OTHER PUBLICATIONS

K. Martin, "Small side-lobe filter design for multitone data—communication applications," IEEE Transactions on Circuits and Systems II: Analog and Digital Signal Processing, vol. 45, No. 8, pp. 1155-1161, Aug. 1998
H. Malvar "Modulated QMF filter banks with perfect reconstruction," Electronics Letters, vol. 26, No. 13, pp. 906-907, Jun. 1990.
D. Pinchon and P. Siohan, in "Derivation of analytical expressions for flexible PR low complexity FBMC systems," in Signal Processing Conference (EUSIPCO), 2013 Proceedings of the 21st European, Sep. 2013.
European Search Report for 16305752.4 dated Nov. 4, 2016.
Davide Mattera et al: "Frequency domain CFO compensation for FBMC systems", Signal Processing., vol. 114, Sep. 1, 2015 (Sep. 1, 2015), pp. 183-197.
Bellanger Maurice et al: "A filter bank multicarrier scheme running at symbol rate for future wireless systems", 2015 Wireless Telecommunications Symposium (WTS), IEEE, Apr. 5, 2015 (Apr. 15, 2015), pp. 1-5.
Maurice Bellanger: "FS-FBMC: An alternative scheme for filter bank based multicarrier transmission", Communications Control and Signal Processing (ISCCSP), 2012 5th International Symposium on, IEEE, May 2, 2012 (May 2, 2012), pp. 1-4.
M Bellanger et al: "FBMC Physical Layer: a Primer", May 27, 2010 (May 27, 2010), pp. 1-31, XP055239692, Retrieved from the Internet: URL:http://www.ict-phydyas.org/teamspace/internal-folder/FBMC-Primer 06-2010.pdf.

* cited by examiner

RECEIVER ARCHITECTURE FOR LINEAR MODULATION BASED COMMUNICATION SYSTEMS

FIELD OF THE INVENTION

The present invention relates to receiver architectures for linear modulation based communication systems, and their design.

BACKGROUND OF THE INVENTION

Forthcoming mobile communication systems will be expected to provide ubiquitous connectivity and seamless service delivery in all circumstances. The large number of devices and the coexistence of human-centric and machine type applications expected will lead to a large diversity of communication scenarios and characteristics. In this context, many advanced communication techniques are under investigation. Each of these techniques is typically optimised for a subset of the foreseen communication scenarios.

One category of techniques is based on filter-bank multicarrier communications principles. A filter-bank multicarrier (FBMC) communications system is composed of a synthesis filter for modulation and an analysis filter for demodulation. The synthesis and analysis filters are composed of M channels, denoted by sub-carriers for a communications system. The channel number m of the synthesis filter modulates a complex signal $c_n(m)$ carrying information at time sample n of the signal before up-sampling by N. This reflects the fact that the signal is sampled in the synthesis filter, before the up-sampling operation, and n correspond to a generic index of this signal. The data is then up-sampled by N, so (N−1) zeros are introduced between two consecutives n values. Each channel consists of an oversampling operation by N followed by a finite impulse response filter $F_m(z)$. These operations can be expressed as follows:

Up-Sampling by N $$C_{\uparrow N,k}(m) = \begin{cases} C_{\frac{k}{N}}(m) & \text{if } \mod_N(kN) = 0 \\ 0 \end{cases} \quad (1)$$

Filter by $F_m(z)$ $$s_m(k) = \sum_{l=-\infty}^{+\infty} C_{\uparrow N,k-l}(m) f_m(l) \quad (2)$$

$$f_m(l) = g(l) e^{\frac{i2\pi lm}{M}} \quad (3)$$

g is referred to as the prototype filter, and is a function with a finite length L:g(k)=0 if k∉ ⟦0,L−1⟧.

The modulated signal s(k) at the output of the synthesis filter is obtained after the sum of each channel output:

$$s(k) = \sum_{m=0}^{M-1} s_m(k) \quad (4)$$

An equivalent relation between the input and output signal of the synthesis filter can be expressed as follows:

$$s(k) = \sum_{m=0}^{M-1} \sum_{n=-\infty}^{+\infty} c_n(m) g(k-nN) e^{\frac{i2\pi km}{M}} \quad (5)$$

This expression leads to the polyphase network representation of the synthesis filter, which is computationally complex to implement when compared to a direct synthesis filter representation.

As regards the analysis filter, the corresponding operations of the transmitter for the M channels are comprised of the following operation:

Filtering by Hm(z):

$$r_m(k) = \sum_{l=-\infty}^{+\infty} r(k-l) h_m(l), \; h_m(l) = g(l) e^{\frac{-i2\pi lm}{M}} \quad (6)$$

Down-Sampling by N:

$$d_n(m) = r_m(nN) \quad (7)$$

The equivalent relation between the input and output signals of the analysis filter can be expressed as follows:

$$d_n(m) = \sum_{k=-\infty}^{+\infty} s(k) g(k-nN) e^{\frac{-i2\pi km}{M}} \quad (8)$$

This basic approach is used in numerous modulation schemes, and as such the design of filters implementing the described approach is an important activity.

This definition of the FBMC technique corresponds to numerous modulation schemes depending on the design of the prototype filters and the choice of the different set of parameters (M, N, L, . . . ). In other words, the technique described generates multiple carriers (as suggested by the MC part of the designation) and the choice of modulation scheme of each carrier may be defined separately, the choice of OQAM being one which is advantageous for certain communications systems. One such modulation scheme is Filter-Bank Multi-Carrier with Offset Quadrature Amplitude Modulation (FBMC/OQAM) which is considered as a key enabler for the future flexible 5G air interface for example. It exhibits a spectrum shape with less out of band energy components compared to the traditional Orthogonal Frequency-Division Multiplexing (OFDM) and enables better spectrum usage and improved mobility support. This is possible thanks to the use of a prototype filter which makes it possible to improve the time and frequency localization properties of the transceiver. Orthogonality is preserved in the real field with the OQAM scheme. FBMC/OQAM implementation is similar to that of OFDM in that it it relies on Fast Fourier Transform (FFT) processing with an additional low-complexity PolyPhase Network (PPN) filtering stage. However, the choice of the prototype filter is crucial for FBMC/OQAM modulation, as the time/frequency localization of this filter can significantly impact the different performance levels and the frame structure of the communication system. Furthermore, the length of the prototype filter impacts the receiver complexity considerably. Thus, design of new filters is of high interest to improve robustness of FBMC/OQAM against channel impairments and to support the constraints imposed by various 5G scenarios while preserving reasonable receiver complexity.

FBMC is a multicarrier transmission scheme that introduces a filter-bank to enable efficient pulse shaping for the signal conveyed on each individual subcarrier. This additional element represents an array of band-pass filters that separate the input signal into multiple components or sub-carriers, each one carrying a single frequency sub-band of the original signal. The process of decomposition performed by the filter bank is called analysis (meaning analysis of the signal in terms of its components in each sub-band); the output of analysis is referred to as a sub-band signal with as many sub-bands as there are filters in the filter bank. The reconstruction process is called synthesis, indicating reconstitution of a complete signal resulting from the filtering process. Such a transceiver structure usually requires a higher implementation complexity due not only to the filtering steps but also to the modifications applied to the modulator/demodulator architecture. However, the use of digital polyphase filter bank structures together with the rapid growth of digital processing capabilities in recent years have made FBMC a practically feasible approach. As a promising variant of filtered modulation schemes, FBMC/OQAM, (also sometimes referred to as OFDM/OQAM or staggered modulated multitone—SMT), can usually achieve a higher spectral efficiency than OFDM since it does not require the insertion of a Cyclic-Prefix (CP). Additional advantages include the robustness against highly variant fading channel conditions and imperfect synchronizations by selecting the appropriate prototype filter type and coefficients. 4G/LTE is based on OFDM multicarrier modulation. In accordance with the Balian-Low theorem, OFDM:
1) respects the complex orthogonality,
2) is poorly localized in frequency domain by adopting a rectangular waveform,
3) wastes part of the available bandwidth due to the addition of a CP.

Property 2 results in high Out-Of-Band Power Leakage (OOBPL), and large guard-bands have to be inserted to respect Adjacent Channel Leakage Power Ratio (ACLR) requirements. Furthermore, it results in a poor robustness against Doppler shift and spread. Further possible disadvantages of the corresponding OFDM system are related to flexible spectrum usage scenarios, where spectrum sharing and fragmented usage are not efficiently supported.

To overcome shortcomings 2) and 3) of OFDM, FBMC/OQAM:
a) relaxes to real field orthogonality,
b) is better localized in time and frequency, depending on the used prototype filter,
c) uses available bandwidth efficiently to achieve a higher spectral efficiency.

Property a) is obtained by changing the way QAM symbols are mapped onto each subcarrier. Instead of sending a complex symbol (I and Q) of duration T as in classical CP-OFDM, the real and imaginary parts are separated and sent with an offset of T/2 (hence the name Offset-QAM).

Improvement b) comes from the introduction of the filter-bank and therefore depends on its type and coefficients.

Property c) is the consequence of the absence of a CP. Previous published works have identified two major design criteria for an FBMC/OQAM system:

Time Frequency Localization (TFL) criterion: for a waveform that is better localized in the time and frequency domains thanks to the prototype filter. It is predictable that FBMC systems exhibit better robustness than CP-OFDM in doubly-dispersive channels and in the case of communications with synchronization errors. To this end filter designs with the optimized TFL criterion have been proposed, such as "Isotropic Orthogonal Transform Algorithm with overlapping factor (OF) equals to 4".

Lower sideband criterion: achieving low out-of-band power leakage in frequency domain and for improving spectrum coexistence with other systems. To this end, particular filter types may be used such as "Martin-Mirabassi-Bellange with OF equals to 4", as considered for FBMC/OQAM during the PHYDYAS project.

FBMC/OQAM System Description

FIG. 1 shows a FS FBMC/OQAM transmitter implementation. As shown, the implementation of FIG. 1 comprises an OQAM mapper 110 comprising a QAM mapper 111 creating real and imaginary values from a binary input. The imaginary values are delayed by T/2 with respect to the real values by delay unit 112. The real and imaginary values are output to respective processing channels. Each processing channel comprises in sequence a pre-processing unit 121, 122, up-sampling units 131, 132, which upscale each signal by a factor of q, a Finite Impulse Response (FIR) filter 141, 142 and an Inverse Fast Fourier Transform block 151, 152. The outputs of the two processing channels are then combined by a summer 160.

The original intention in this technology was to shift the filtering stage into the frequency domain, to enable the use of a low-complexity per-sub-carrier equalizer as in OFDM. The hardware complexity is presumed to be higher than the complexity of the alternative Polyphase Network (PPN) implementation, at least for long filters. In fact, it requires one FFT of size L=qM per OQAM symbol, where q is the overlapping factor, and M the total number of available sub-carriers. However, in a short filter case (q=1), the size of the FFT is the same as for the PPN implementation.

FIG. 2 shows an FS FBMC/OQAM Receiver implementation. It is assumed that the received signal is sampled by a corresponding sampling frequency (whose value depends on the bandwidth). As shown in the figure, a first sliding window 261 is applied on a number of samples. The number of samples depends on the window length.

The received signal is furthermore subjected to an M/2 delay by delay unit 270, where M is the length of the first sliding window 261 and also a second sliding window 262 to which the output of the delay unit 270 is fed, so that the two sliding windows 261, 262 overlap by half their respective lengths in number of samples. Each sliding window 261, 262 outputs samples to respective Fast Fourier Transform units 251, 252. Fast Fourier Transform units 251, 252 provide their outputs to respective Digital Filters 241, 242, the outputs of which are then down-sampled at down-sampling units 231, 232 which down-sample by a factor of q.

Typical FBMC/OQAM architectures use a prototype filter with a duration 4 times longer than an OFDM symbol. However, a shorter filter can also be applied, such as the "Quadrature Mirror Filter with OF equal to 1" which when applied to FBMC/OQAM, leads to a variant denoted "Lapped-OFDM modulation".

When compared to long filters, short filters provide certain advantages:
Transition between two successive radio frames due to the filter convolution is shortened, increasing the spectral efficiency of the transmission. The overhead is only M/2 samples for a short filter with an OF of 1, compared to 7M/2 for typical long filters.
By consequence, latency is greatly reduced, and is also a critical performance indicator for 5G. Some applications, like vehicle to vehicle communication, have a target latency of less than 1 millisecond.

Short filters are more resilient to Carrier Frequency Offset introduced by Doppler shift and spread, or misalignment of the local oscillator between the transmitter(s) and the receiver which results in CFO impairment. In 5G, the transceiver has to support mobility up to 500 km/h, 200 km/h higher than in 4G/LTE. Furthermore, airplane connectivity is also considered in 5G, which raises the demand to 1000 km/h. Thus, the sensitivity to Doppler shift and CFO is a critical issue and OFDM using 4G/LTE parameters cannot easily support such mobility requirements.

The hardware complexity is highly reduced when using a short filter, particularly in terms of memory requirements. At the transmitter side, an optimization of the FBMC/OQAM modulator is possible and provides a hardware complexity comparable to OFDM.

Preamble based channel estimation using the Interference Approximation Method (IAM) provides the best results when using a short filter, andoutperforms OFDM. It presents however a high Peak-to-Average Power Ratio (PAPR) making it more difficult to use in practice.

Space-Time Block Coding (STBC) Multiple Input Multiple Output (MIMO) diversity scheme can be applied with minimal spectral efficiency loss when using the block-type implementation, due to a shorter block transition.

PAPR reduction techniques are more efficient when using short filters.

It is accordingly desirable to find short prototype filter designs with good performance and low hardware complexity, and methodologies for developing such designs. In particular, it is desirable to reduce the number of non-zero coefficients of the frequency response of the prototype filter for a target Signal-to-Interference-Ratio (SIR), in order, for example, to reduce the hardware complexity of the FS implementations of filter-bank receivers such as those implementing FBMC/OQAM.

SUMMARY OF THE INVENTION

In accordance with the present invention in a first aspect there is provided a Filter Bank Multicarrier frequency spread receiver for decoding a signal, where the receiver comprises a linear phase rotation module adapted to introduce a linear phase rotation to a time domain signal, a discrete Fourier transform unit and a Finite Impulse Response digital filter, wherein the coefficients of the Finite Impulse Response digital filter define a shift of a frequency response of the prototype filter of the receiver, and wherein the introduced linear phase rotation is compensated by the frequency shift of the Finite Impulse Response digital filter. A receiver adopting this structure can be expected to offer improved performance in terms of Signal to Interference ratio with a reduced number of filter coefficients compared to equivalent designs.

In a development of the first aspect, the coefficients of the digital filter are truncated to include a minimal number of coefficients sufficient to achieve a desired Signal to Interference ratio.

In a development of the first aspect, the frequency shift is equal to the reciprocal of a power of two of the modulation sub carrier spacing.

In a development of the first aspect, the frequency shift is equal to half the modulation sub carrier spacing.

In a development of the first aspect, the digital filter has fewer coefficients than the frequency response of the prototype filter.

In a development of the first aspect, the filter-bank impulse response of the prototype filter satisfies the Nyquist criterion.

In a development of the first aspect, the prototype filter is one of the QMF filter, the TFL1 filter, or the IOTA filter.

In a development of the first aspect, the Filter Bank Multicarrier receiver comprises a linear phase rotation module, a discrete Fourier transform and a Finite Impulse response digital filter in a first group, and a further linear phase rotation module, a further discrete Fourier transform and a further Finite Impulse response digital filter in a second group, wherein the first group and second group are arranged to process a first signal stream and a second signal stream respectively in parallel, wherein the first signal stream and the second signal stream are orthogonal to each other.

In a further development of the first aspect, the first signal stream and the second signal stream constitute an OFDM signal.

In a further development of the first aspect, the first signal stream and the second signal stream constitute an FBMC signal.

In accordance with the present invention in a second aspect there is provided a method of defining a filter for a digital radio receiver, comprising the steps of
  defining a prototype filter,
  obtaining a frequency shifted version of the prototype filter, and
  truncating the coefficients defining the frequency shifted version of the prototype filter to the minimum number of coefficients enabling the frequency shifted version of the prototype filter to achieve a predefined Signal to Noise level.

In accordance with the present invention in a third aspect there is provided method of decoding a Filter Bank Multi-carrier encoded signal, comprising the steps of
  obtaining digital samples s(k) at a specified sampling rate,
  grouping the samples into groups of predetermined size,
  imposing a frequency shift equal to a predetermined fraction of the sub-carrier space on the groups,
  transforming the time-domain frequency shifted and grouped samples to the frequency domain, and then
  filtering so as to compensate the frequency shift.

Decoding a signal on the basis of these steps can be expected to offer improved performance in terms of Signal to Interference ratio with a reduced number of filter coefficients compared to equivalent designs.

In accordance with the present invention in a fourth aspect there is provided computer program adapted to implement the steps of the second or third aspects.

BRIEF DESCRIPTION OF THE DRAWINGS

The above and other advantages of the present invention will now be described with reference to the accompanying drawings, in which.

DETAILED DESCRIPTION

Multicarrier encoding schemes in general and FBMC based systems in particular are known to be sensitive to variations in carrier frequency, known as Carrier Frequency Offset (CFO), which tend to undermine the orthogonality of adjacent sub-carriers, leading generally to intercarrier interference (ICI), and reducing performance. It is thus a general objective in the field of FBMC system development to minimize CFO.

Short prototype filters for FBMC modulation have multiple advantages (low complexity, robustness to Doppler shift/CFO, latency . . . ). Combined with the Frequency-Spread (FS) implementation, the FBMC receiver can support multipath channels with moderate delay spread (EPA/EVA LTE channels) when using a low-complexity 1 tap equalizer. This FS implementation shifts the time domain filtering stage (the polyphase network with the impulse response of the prototype filter) to the frequency domain (after the DFT) by using a FIR filter between the output of the DFT and the frequency response of the prototype filter. Using this technique, it is also possible to compensate the carrier-frequency offset (CFO) in the frequency domain. This is done by generating the shifted frequency domain response of the prototype filter and using the corresponding coefficients for the FIR filter of the FS implementation.

The inventors of the present application have determined that unexpectedly, for some prototype filters, fewer non-zero coefficients are required to achieve a target Signal to Interference Ratio (SIR) with a CFO compensation than with no CFO compensation.

Accordingly, it is proposed to deliberately introduce a frequency offset, equivalent to a linear phase rotation, in the received time domain signals at the receiver side, and then compensate this offset in the frequency domain by shifting the frequency response of the prototype filter 241, 242, and thereby reduce the number of non-zero coefficients of the FIR filter for a specified SIR.

Figure 3:
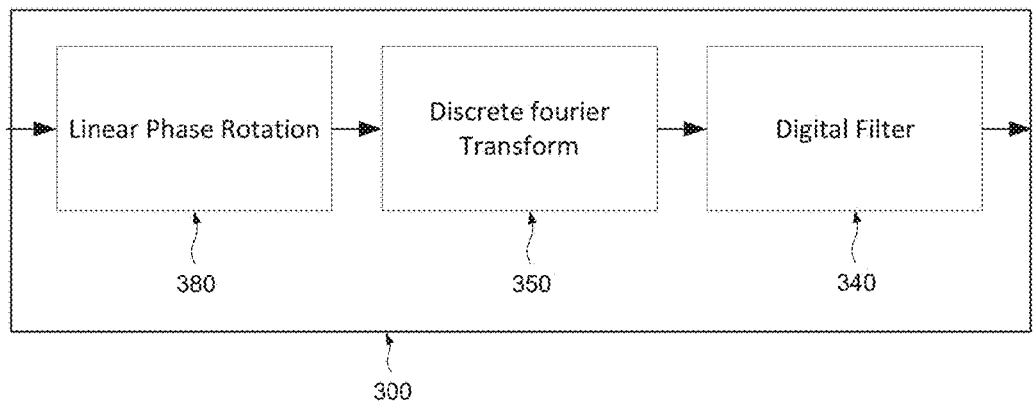
FIG. 3 shows details of a first embodiment.

FIG. 3 shows details of a first embodiment.

As shown in FIG. 3, there is provided a Filter Bank Multicarrier frequency spread receiver 300 for decoding a signal from a corresponding Filter Bank Multicarrier transmitter (not shown). The receiver 300 comprises a linear phase rotation module 380 adapted to introduce a linear phase rotation to a time domain signal, a discrete Fourier transform 350, and a Finite Impulse Response digital filter 340. The coefficients of the digital filter 340 define a shift of the frequency response of the prototype filter of the receiver, and the introduced linear phase rotation is compensated by this frequency shift of the digital filter.

The frequency shift implemented by the linear phase rotation module 380 and compensated by the digital filter 340 is equal to the reciprocal of a power of two of the modulation sub carrier spacing. For example, the frequency shift implemented by the linear phase rotation module 380 and compensated by the digital filter 340 may be ½ of the modulation sub carrier spacing, ¼ of the modulation sub carrier spacing, ⅛ of the modulation sub carrier spacing, and so on.

Figure 4:
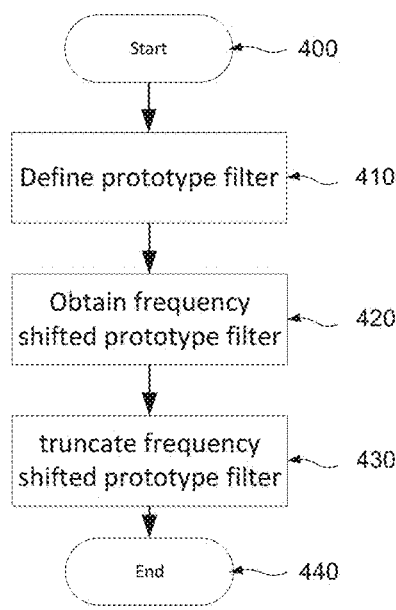
FIG. 4 shows the steps of a method of designing a filter in accordance with an embodiment.

FIG. 4 shows the steps of a method of designing a filter in accordance with an embodiment.

As shown in FIG. 4, the method starts at step 400 before proceeding to step 410 at which a prototype filter g is defined.

g is a prototype of length L=qM, where q represents the overlapping factor of the filter bank system and M the (I)DFT size of the critically sampled polyphase decomposition of the filter-bank system. The only constraint imposed by this filter is having a length which is a multiple of M, with $$M \in [\![ 1,+\infty [\![$$

$$q \in [\![ 1,+\infty [\![$$

In many implementations M may be a power of two, and q≥4, which may tend to minimize hardware complexity and latency issues.

g can be designed from scratch using a variety of methods.

In one filter design method, the prototype filter g may be designed by optimizing filter coefficients in the frequency domain to fulfil Time-Frequency Localization requirements and the Nyquist Criterion.

Figure 5A:
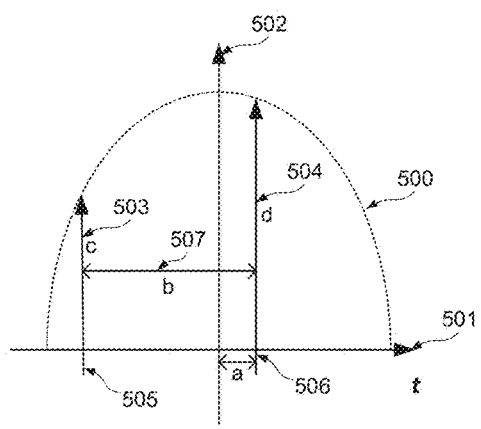
FIG. 5a illustrates the Nyquist criterion for a filter bank system.

FIG. 5a illustrates the Nyquist criterion for a filter bank system. As shown in FIG. 5a, a prototype filter impulse response 500 is plotted with time on the x axis 501 and power on the y axis 502. A first filter response 503 is plotted at a first time 505, and a second filter response 504 is plotted at a second time 506, the two time-shifted filter responses being separated by a time shift b, 507.

Figure 5B:
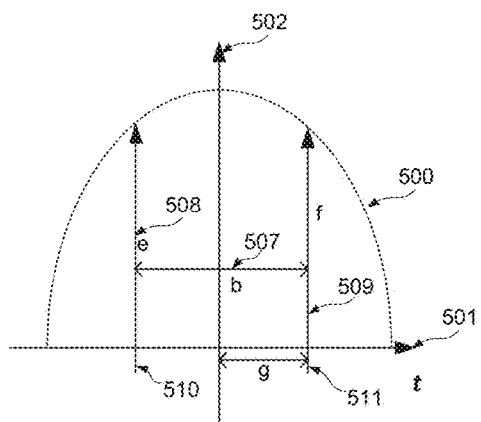
FIG. 5b further illustrates the Nyquist criterion for a filter bank system.

FIG. 5b further illustrates the Nyquist criterion for a filter bank system. As shown in FIG. 5b, the prototype filter impulse response 500 of FIG. 5a is plotted, with time on the x axis 501 and power on the y axis 502. A first filter response 508 is plotted at a third time 510, and a fourth filter response 509 is plotted at a second time 511, the two time-shifted filter responses being separated by the same time shift b as for FIG. 5a, 507.

Although in FIGS. 5a and 5b the abscissa for the filter responses is different (a and g respectively), the total of the powers of the first and second filter responses c+d is equal to the total of the powers of the third and four filter responses e+f. For a prototype filter of a filter bank satisfying the Nyquist criterion, this will be true for any pair of filter responses shifted by the same time.

Accordingly, the filter-bank impulse response of the prototype filter may be selected as satisfying the Nyquist criterion.

Another design method involves the optimization of filter coefficients using a compact representation by decomposing the impulse response of the filter into an angular-based representation of the corresponding polyphase network. This representation ensures that the Nyquist criterion is respected, and the angular parameters are optimized to meet the TFL criterion. This method is described in D. Pinchon, P. Siohan, and C. Siclet, "Design techniques for orthogonal Modulated filterbanks based on a compact representation," IEEE Transactions on Signal Processing, vol. 52, no. 6, pp. 1682-1692, June 2004.

Other design methods involve the Isotropic Orthogonal Transform Algorithm (IOTA) as described by B. le Floch, M. Alard, C. Berrou. in "Coded orthogonal frequency division multiplex". Proceedings of the IEEE, vol. 83, pp. 982-996, June 1995, or the Square Root Raised Cosine functions.

Filters developed according to the above principles are particularly suited for digital modulation schemes such as cyclic or linear convolution based communication systems, for example.

Still further, prototype filter designs selected from known prototype filter designs may also be found to satisfy selection criteria as discussed above, and provide the basis of new filter designs for this or other applications, such as

- IOTA Filter as described in B. Le Floch, M. Alard, and C. Berrou, "Coded orthogonal frequency division multiplex [TV broadcasting]," Proceedings of the IEEE, vol. 83, no. 6, pp. 982-996, June 1995
- FS 4 filter as described in D. Pinchon, P. Siohan, C. Siclet, Design techniques for orthogonal modulated filter banks based on a compact representation, IEEE Trans. Signal Process. 52 (June (6)) (2004) 1682-1692.
- MMB filter with OF superior to 4 as described in K. Martin, "Small side-lobe filter design for multitone data-communication applications," IEEE Transactions on Circuits and Systems II: Analog and Digital Signal Processing, vol. 45, no. 8, pp. 1155-1161, August 1998.
- QMF filter. as described in "Modulated QMF filter banks with perfect reconstruction," by H. Malvar, Electronics Letters, vol. 26, no. 13, pp. 906-907, June 1990.
- TFL1 filter as described by D. Pinchon and P. Siohan, in "Derivation of analytical expressions for flexible PR low complexity FBMC systems," in Signal Processing Conference (EUSIPCO), 2013 Proceedings of the 21st European, September 2013.

By way of example a half sine filter may be adopted as the prototype filter, whereby for q=1

$$g(k) = \sin\left(\frac{\pi k}{M}\right), k \in [0, M-1] \quad (9)$$

On this basis, the following coefficients may be obtained by applying a discrete Fourier transform of size M=512:

G(0)=0.6366
G(1)=-0.2122
G(2)=-0.0424
G(3)=-0.0182
G(4)=-0.0101
G(5)=-0.0064
G(6)=-0.0045
G(7)=-0.0033
G(8)=-0.0025
G(9)=-0.0020

Once the prototype filter is defined at step 410, the method proceeds to step 420, at which a frequency shifted prototype filter $G_{HFS}$ is obtained. If the frequency is shifted by half of the sub-carrier spacing for example, the following calculation applies:

$$G_{HFS}(m) = \frac{1}{qM} \sum_{k=0}^{qM-1} g(k) e^{-i2\pi\varepsilon\frac{k}{M}} e^{-i2\pi k\frac{m}{qM}} \quad (10)$$

Where ε=½ or ε=-½. Both definitions are possible, and lead to the same performance.

This equation may be computed using the following algorithm:

Step A: Multiply g(k) by $$e^{-i2\pi\varepsilon\frac{k}{M}},$$

k∈[0, qM-1], to obtain $g_{HFS}(k)$

Step B: Compute the Discrete Fourier Transform of size qM of $g_{HFS}(k)$ to obtain $G_{HFS}(m)$.

The method may then terminate. Optionally, the method may comprise an additional step 430, whereby the coefficients of the frequency shifted filter may be truncated, so as to strike the desired compromise between implementation complexity in terms of the number of taps in the circular convolution, and performance in terms of Signal to Interference Ratio.

The truncation of the frequency shifted filter may be obtained by retaining a selected number $C_g$ of non-zero coefficients.

Figure 6:
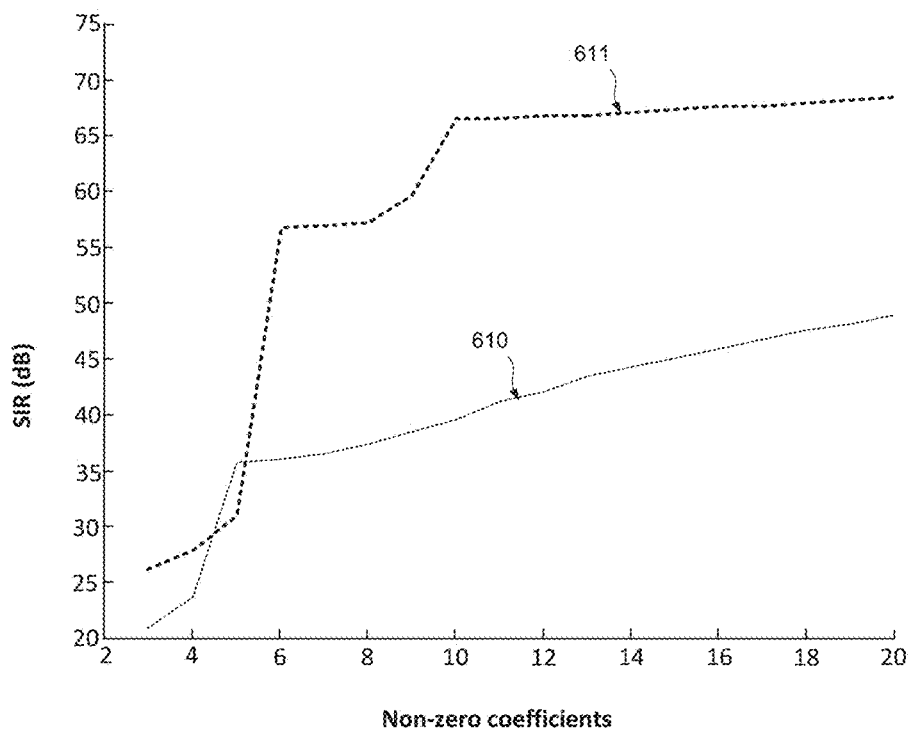
FIG. 6 shows a possible relationship between the number of coefficients in a filter design and the specified signal to interference ratio attained.

FIG. 6 shows a possible relationship between the number of coefficients in a filter design and the specified signal to interference ratio attained. As shown, the Signal to Interference performance corresponding to certain prototype filters mentioned above is plotted against the number of coefficients retained after truncation. Specifically, line 610 represents the Signal to Interference performance for the TFL1 filter without frequency shift and line 611 represents the Signal to Interference performance for the TFL1 filter with frequency shift. As can be seen, the performance of the frequency shifted filters is generally superior to that of the un-shifted version. It is further clear that the performance improvement for additional coefficients rapidly tails off for most filter designs.

As such, the coefficients of the digital filter may be truncated to include the minimal number of coefficients sufficient to achieve a desired Signal to Interference ratio.

The digital filter may thus have fewer coefficients than the frequency response of the prototype filter.

Applying this to the half sine filter example, with a value of ε=-½, the following Frequency Shifted values are obtained:

$G_{HFS}(0) = 0.5i$ $G_{HFS}(1) = -0.5i$ $G_{HFS}(2) = 0$ $G_{HFS}(3) = 0$ (...)

$G_{HFS}(9) = 0$

Thus in this example only two coefficients need be retained, and the others may be truncated without degradation in performance.

The method then terminates at step 440.

Figure 7:
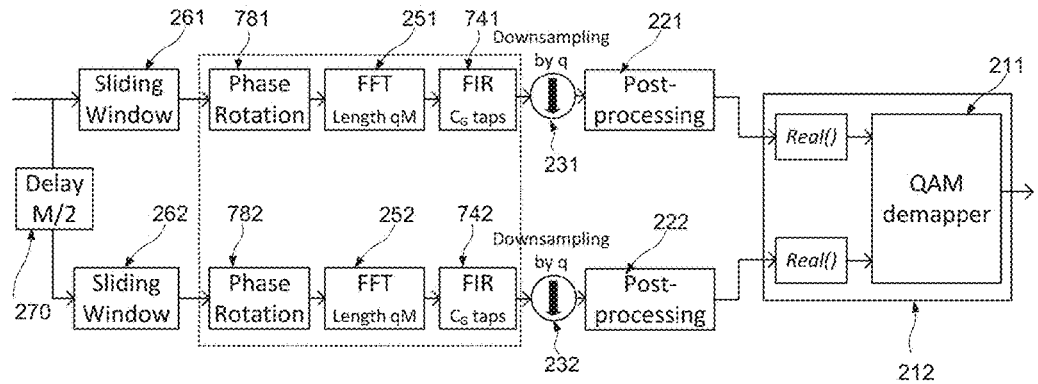
FIG. 7 presents a receiver in accordance with an embodiment.

FIG. 7 presents a receiver in accordance with an embodiment.

Figure 1:
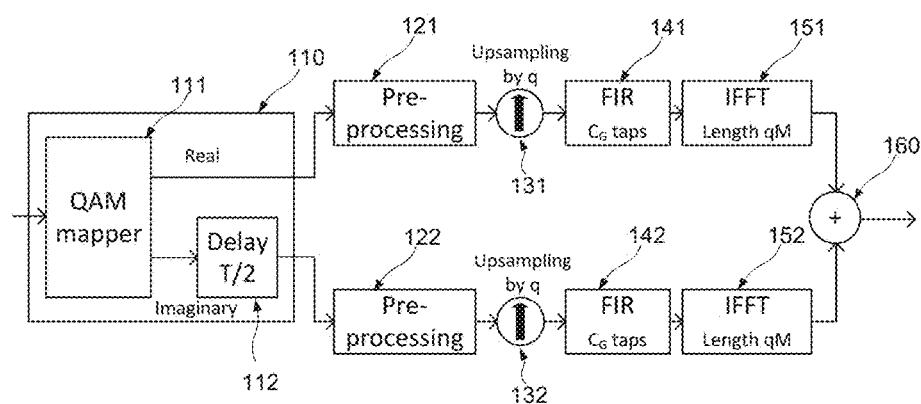
FIG. 1 shows a PPN FBMC/OQAM transmitter implementation.
Figure 2:
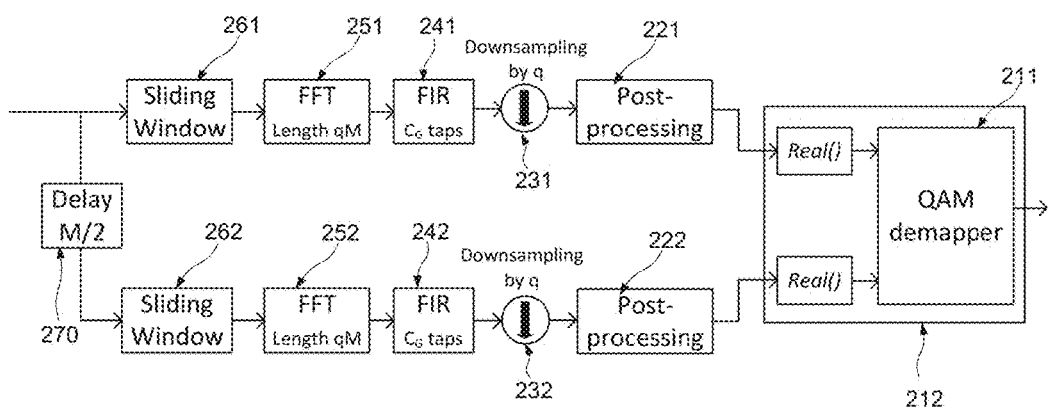
FIG. 2 shows a FS FBMC/OQAM transmitter implementation.

Specifically, FIG. 7 shows an FS FBMC/OQAM Receiver similar to that of FIG. 2, incorporating the elements described with reference to FIG. 3. As shown, a received signal is sampled by a first sliding window 261. The received signal is furthermore subjected to a M/2 delay by delay unit 270, where M is the length of the first sliding window 261 and also a second sliding window 262 to which the output of the delay unit 270 is fed, so that the sampled periods of the two sliding windows 261, 262 overlap by half their respective lengths. Each sliding window 261, 262 outputs samples to respective phase rotation modules 781, 782, each corresponding to the linear phase rotation module 380 described above with reference to FIG. 3. Phase rotation modules 781, 782 provide their outputs to Fast Fourier Transform units 251, 252. Fast Fourier Transform units 251, 252 provide their outputs to respective Digital Filters 741, 742, which are configured to implement the filter function $G_{HFS}$ discussed above, the outputs of which are then down-sampled at down-sampling units 231, 232 which down-sample by a factor of q.

More specifically, digital samples s(k) obtained after the analogue to digital converter (not shown) at the frequency sampling rate of the system are grouped into N groups of qM samples. N is dependent on the system parameters of the modulation used, and may be for example the number of multicarrier symbols.

$$s_n(k)=s(k+I_n), k\in [\![ 0,qM-1 ]\!], n\in [\![ 0,N-1 ]\!]$$

where $I_n$ represents the first index of interval which defines the group number n, and $s_n$ the samples if the group number n. For instance, in an FBMC/OQAM system such as shown in figure $$7 I_n = n\frac{M}{2},$$

whereas for OFDM $I_n$=nM (and q=1).

In accordance with the present embodiment the frequency shift implemented by phase rotation modules 781, 782 is equal to half the sub-carrier sp ace.

On this basis, the N group baseband samples $s_n$ are computed as $$v_n(k) = s_n(k)e^{i2\pi\varepsilon\frac{k}{M}}$$

Where ε=½ or ε=−½ depending on the choice made during the design of the filter as described above.

The DFTs 251, 252 next transform the time-domain frequency shifted and grouped base-band samples output by the phase rotation modules 681, 682 to the frequency domain. With DFTs of size qM, $$x_n(m) = \sum_{k=0}^{qM-1} v_n(k)e^{-i2\pi\frac{km}{qM}} \quad (11)$$

Finally, the effect of the FIRs $C_G$ can be efficiently calculated by applying a circular convolution:

$$y_n(m) = \sum_{k\in\Omega} G_{HFS}(k)x_n(\text{mod}_{qM}(m-k)) \quad (12)$$

Where $\text{mod}_{qm}$ represents the modulus qM operator, and Ω is the value obtained from the number of coefficients retained at truncation of the filter as described above, in accordance with the following:

If $C_g$ is an even number, $\Omega=[\![-\Delta+1, \Delta]\!]$ or $\Omega=[\![-\Delta, \Delta+1]\!]$, where $\Delta=C_g/2$ If $C_g$ is an odd number, $\Omega=[\![-\Delta, \Delta]\!]$, where $\Delta=(C_G-1)/2$ While FIG. 7 presents an OQAM receiver, and as such provides two independent channels for the processing of I and Q symbols respectively, each corresponding to the components of FIG. 3, other implementations are envisaged, for example implementing any filter-bank based modulation scheme, whether orthogonal or not, OQAM or not. If OQAM is not used, only one component is applied, for instance in the case of FBMC/QAM, FMT and the like.

The implementation of the filter depends on the encoding scheme architecture, and may use any conventional filter architecture as will be apparent to the skilled person.

Figure 8:
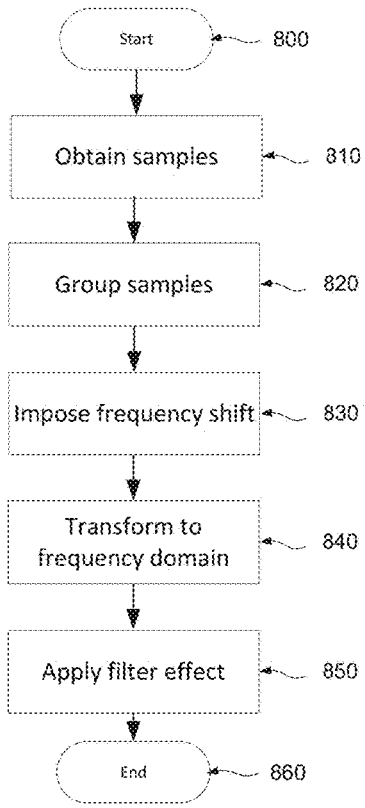
FIG. 8 shows a method of decoding a Filter Bank Multicarrier encoded digital radio signal in accordance with an embodiment.

FIG. 8 shows a method of decoding a Filter Bank Multicarrier encoded digital radio signal in accordance with an embodiment.

Digital samples s(k) are obtained at step 810 at the frequency sampling rate of the system, and grouped into P groups of qM samples at step 820, corresponding to the sliding window operation. P is dependent on the system parameters of the modulation used, and may be for example the number of multicarrier symbols.

$$s_n(k)=s(k+I_n), k\in [\![ 0,qM-1 ]\!], n\in [\![ 0,P-1 ]\!]$$

where $I_n$ represents the first index of interval which defines the group number n, and $s_n$ the samples if the group number n. For instance, in an FBMC/OQAM system such as shown in FIG. 7, $$I_n = n\frac{M}{2},$$

whereas for OFDM In=nM (and q=1).

The method next proceeds to step 830 at which a frequency shift is imposed on the signal.

If the frequency shift is equal to half the sub-carrier space, the N group baseband samples $s_n$ are computed as $$v_n(k) = s_n(k)e^{i2\pi\varepsilon\frac{k}{M}}$$

Where ε=½ or ε=−½ depending on the choice made during the design of the filter as described above with reference to FIG. 4.

The method next proceeds to step 840, at which the time-domain frequency shifted and grouped base band samples are derived at step 430 are transformed to the frequency domain. For example, with DFTs of size qM, $$X_n(m) = \sum_{k=0}^{qM-1} v_n(k)e^{-2\pi\frac{km}{qM}} \quad (13)$$

Finally, at step 850 the filter effect $C_G$ compensating the frequency shift as determined in accordance for example with the method of FIG. 4 can be applied, for example by applying a circular convolution:

$$y_n(m) = \sum_{k\in\Omega} G_{HFS}(k)x_n(\text{mod}_{qM}(m-k)) \quad (14)$$

Where $\text{mod}_{qm}$ represents the modulus qM operator, and $\Omega$ is a value obtained from the number of coefficients retained at truncation of the filter as described above, in accordance with the following:

If $C_g$ is an even number, $\neq \llbracket -\Delta+1, \Delta \rrbracket$ or $\Omega = \llbracket -\Delta, \Delta+1 \rrbracket$, where $\Delta = C_g/2$ If $C_g$ is an odd number, $\Omega = \llbracket -\Delta, \Delta \rrbracket$, where $\Delta = (C_{g-1})/2$ The method then proceeds to step 860, at which the filtered values are down-sampled by a factor q, such that $$c_n(m) = y_n(qm),$$

With $c_n(m)$ being the output sample of the synthesis filter at the sub-carrier number m, time slot n The down-sampled values produced by this operation thus correspond to the output of the synthesis filter (filter-bank receiver).

The resulting values can then be decoded by means of an OQAM demapper in the conventional manner (not shown).

The method then terminates at step 870.

For a PPN-based implementation, the filter is used as a window function, thus it is simply a multiplication of the coefficients at the input of the FFT (receiver side). For this implementation, it is preferable to use the non-truncated version. This implies no change in complexity.

For a Frequency Spread-based implementation, the filter is implemented as a discrete-time FIR filter, after the FFT on the receiver side. The truncated version may be used to reduce the complexity.

In some cases a PPN implementation at the transmitter side and Frequency Spread implementation at Receiver side may prove advantageous. Other implementation details and variants of these methods may be envisaged, in particular corresponding to the variants of the apparatus described with reference to the preceding drawings.

Thus according to certain embodiments there is provided a receiver for Filter Bank Multicarrier frequency spread signals such as FBMC, FBMC/OQAM, OFDM, comprising a linear phase rotation module adapted to introduce a linear phase rotation to a received time domain signal, a discrete Fourier transform and a Finite Impulse response digital filter. The coefficients of the digital filter define a shift of the frequency response of the prototype filter of the receiver, and the coefficients of the digital filter are fixed so as to compensate the linear phase rotation introduced by the filter. The frequency shift introduced may be equal to the reciprocal of a power of two of the modulation sub carrier spacing.

The disclosed methods can take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

These methods and processes may be implemented by means of computer-application programs or services, an application-programming interface (API), a library, and/or other computer-program product, or any combination of such entities.

Figure 9:
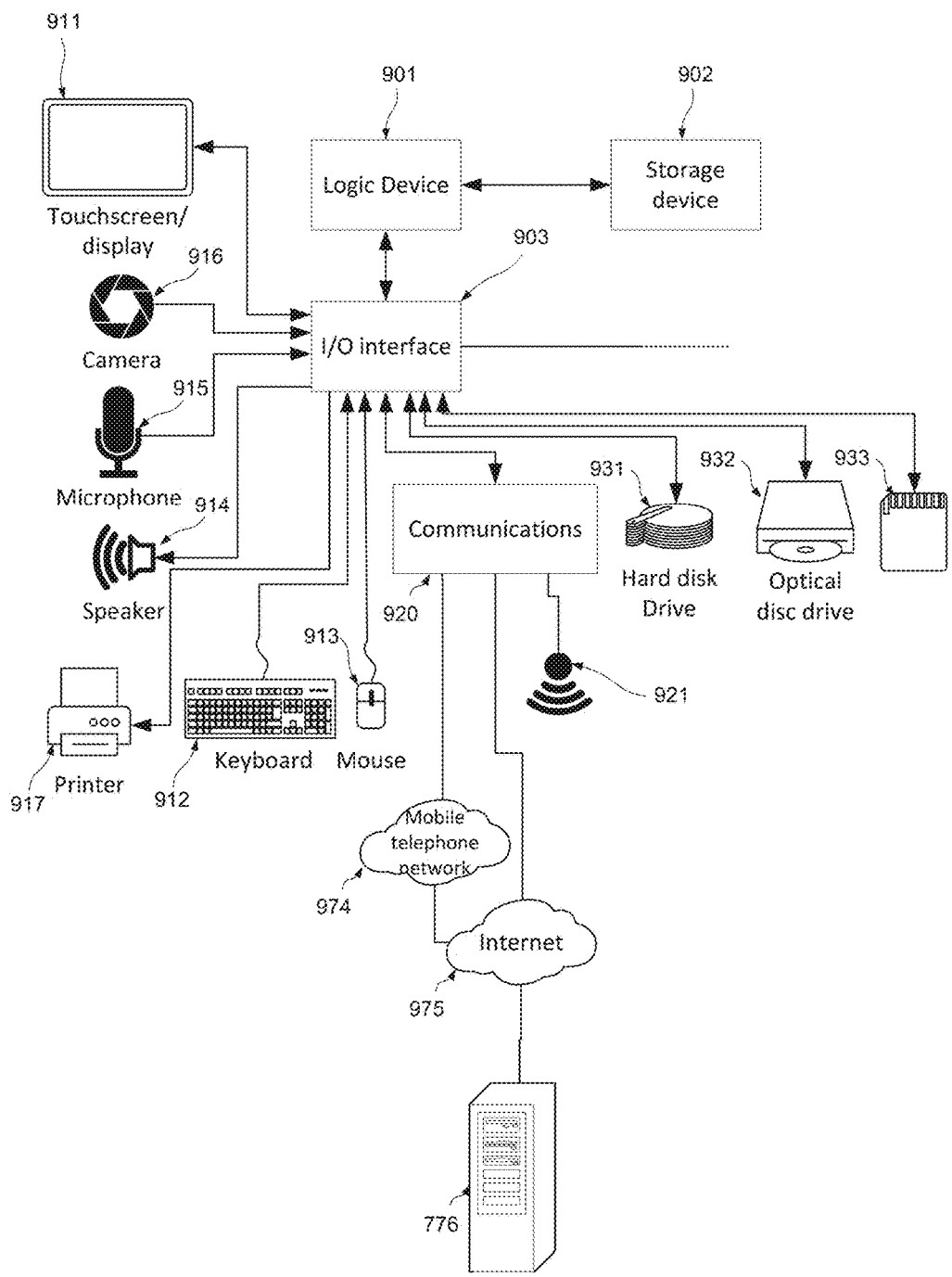
FIG. 9 shows a generic computing system suitable for implementation of embodiments of the invention.

FIG. 9 shows a generic computing system suitable for implementation of embodiments of the invention.

A shown in FIG. 9, a system includes a logic device 901 and a storage device 902. The system may optionally include a display subsystem 911, input/output subsystem 903, communication subsystem 920, and/or other components not shown.

Logic device 901 includes one or more physical devices configured to execute instructions. For example, the logic device 901 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 901 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 901 optionally may be distributed among two or more separate devices, which may be remotely located and/or configured for coordinated processing. Aspects of the logic device 901 may be virtualized and executed by remotely accessible, networked computing devices configured in a cloud-computing configuration.

Storage device 902 includes one or more physical devices configured to hold instructions executable by the logic device to implement the methods and processes described herein. When such methods and processes are implemented, the state of storage 902 device may be transformed—e.g., to hold different data.

Storage device 902 may include removable and/or built-in devices. Storage device 902 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, nonvolatile, dynamic, static, read/write, read-only, random-access, sequential-access, location-addressable, file-addressable, and/or content-addressable devices.

In certain arrangements, the system may comprise an i/o interface 903 adapted to support communications between the Logic device 901 and further system components. For example, additional system components may comprise removable and/or built-in extended storage devices. Extended storage devices may comprise one or more types of storage device including optical memory 932 (e.g., CD, DVD, HD-DVD, Blu-Ray Disc, etc.), semiconductor memory 933 (e.g., FLASH RAM, EPROM, EEPROM, FLASH etc.), and/or magnetic memory 931 (e.g., hard-disk drive, floppy-disk drive, tape drive, MRAM, etc.), among others. Such extended storage device may include volatile, nonvolatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 901 and storage device 902 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 9 may be used to implement embodiments of the invention.

For example a program implementing the steps described with respect to FIG. 4 or 8 may be stored in storage device 902 and executed by logic device 901. The prototype filter design may be buffered in the storage device 902. The Logic device 901 may implement the Phase rotation, Fourier Transform or Filter steps as described above under the control of a suitable program, or may interface with internal or external dedicated systems adapted to perform some or all of these processes such as hardware accelerated encoders/decoders and the like. Furthermore, a program may implement a transmitter or receiver implementing an encoder or decoder in accordance with embodiments for example as described above. These tasks may be shared among a number of computing devices, for example as described with reference to FIG. 9. The encoded signal may be received via the communications interface 920, which may incorporate implementations of some or all of the elements of FIG. 7.

Accordingly the invention may be embodied in the form of a computer program.

It will be appreciated that a "service", as used herein, is an application program executable across multiple user sessions. A service may be available to one or more system components, programs, and/or other services. In some implementations, a service may run on one or more server-computing devices.

When included, display subsystem 911 may be used to present a visual representation of the data transmitted or received, or may present statistical information concerning the processes undertaken. As the herein described methods and processes change the data held by the storage device 902, and thus transform the state of the storage device 902, the state of display subsystem 911 may likewise be transformed to visually represent changes in the underlying data. Display subsystem 911 may include one or more display devices utilizing virtually any type of technology. Such display devices may be combined with logic device and/or storage device in a shared enclosure, or such display devices may be peripheral display devices.

When included, input subsystem may comprise or interface with one or more user-input devices such as a keyboard 912, mouse 913, touch screen 911, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 920 may be configured to communicatively couple computing system with one or more other computing devices. For example, communication module of may communicatively couple computing device to remote service hosted for example on a remote server 976 via a network of any size including for example a personal area network, local area network, wide area network, or the internet. Communication subsystem may include wired and/or wireless communication devices compatible with one or more different communication protocols. As non-limiting examples, the communication subsystem may be configured for communication via a wireless telephone network 974, or a wired or wireless local- or wide-area network. In some embodiments, the communication subsystem may allow computing system to send and/or receive messages to and/or from other devices via a network such as the Internet 975. The communications subsystem may additionally support short range inductive communications 921 with passive devices (NFC, RFID etc).

Figure 10:
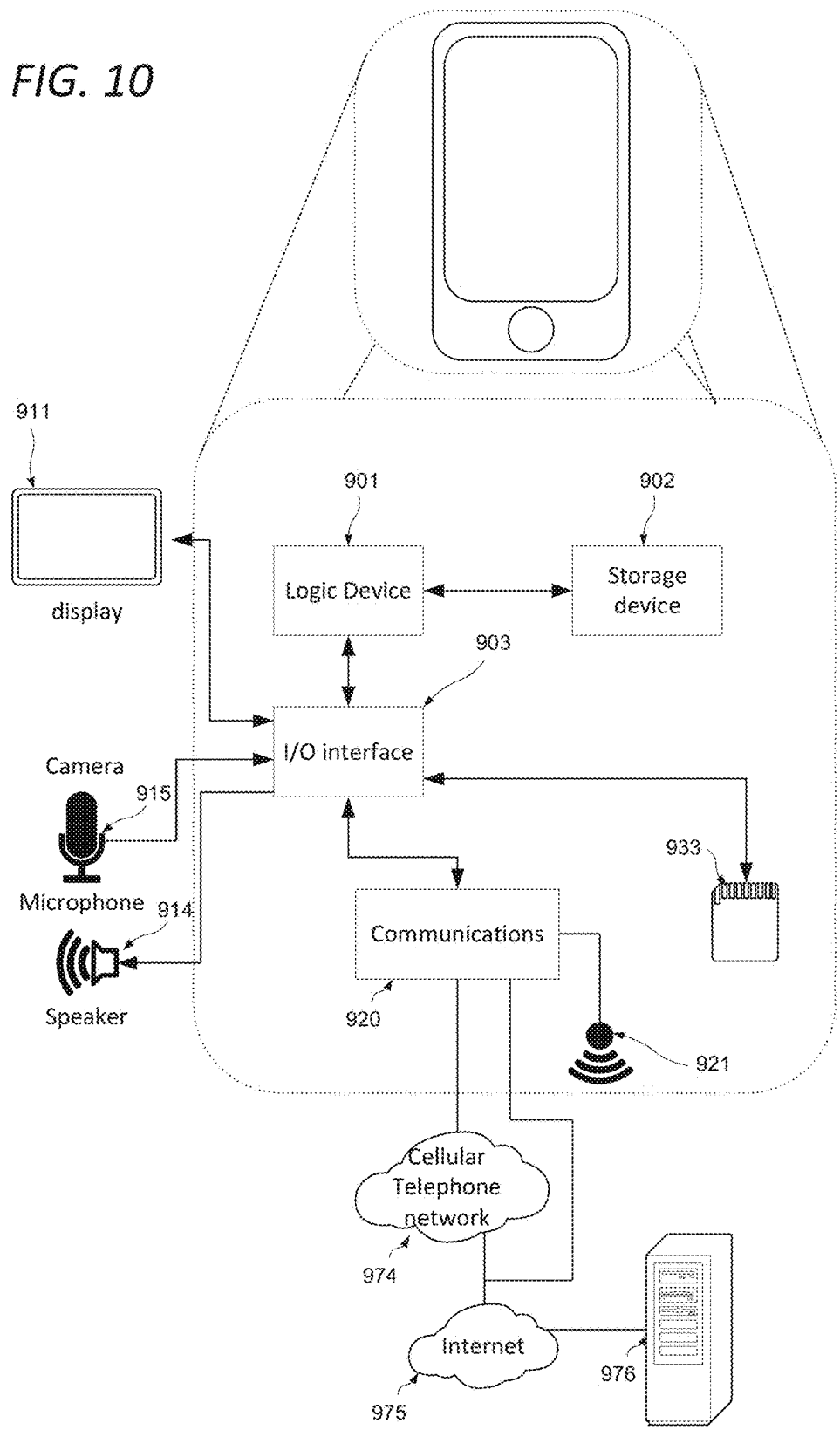
FIG. 10 shows a smartphone device adaptable to constitute an embodiment.

FIG. 10 shows a smartphone device adaptable to constitute an embodiment. As shown in FIG. 10, the smartphone device incorporates elements 901, 902, 903, 920, near field communications interface 921, flash memory 933, elements 914, 915, and 911 as described above. It is in communication with the telephone network 974 and a server 976 via the network 975. Although shown as a smartphone, equivalent functionality may be implemented in any radio communications device, such as a feature-phone, tablet device and so forth.

Figure 11:
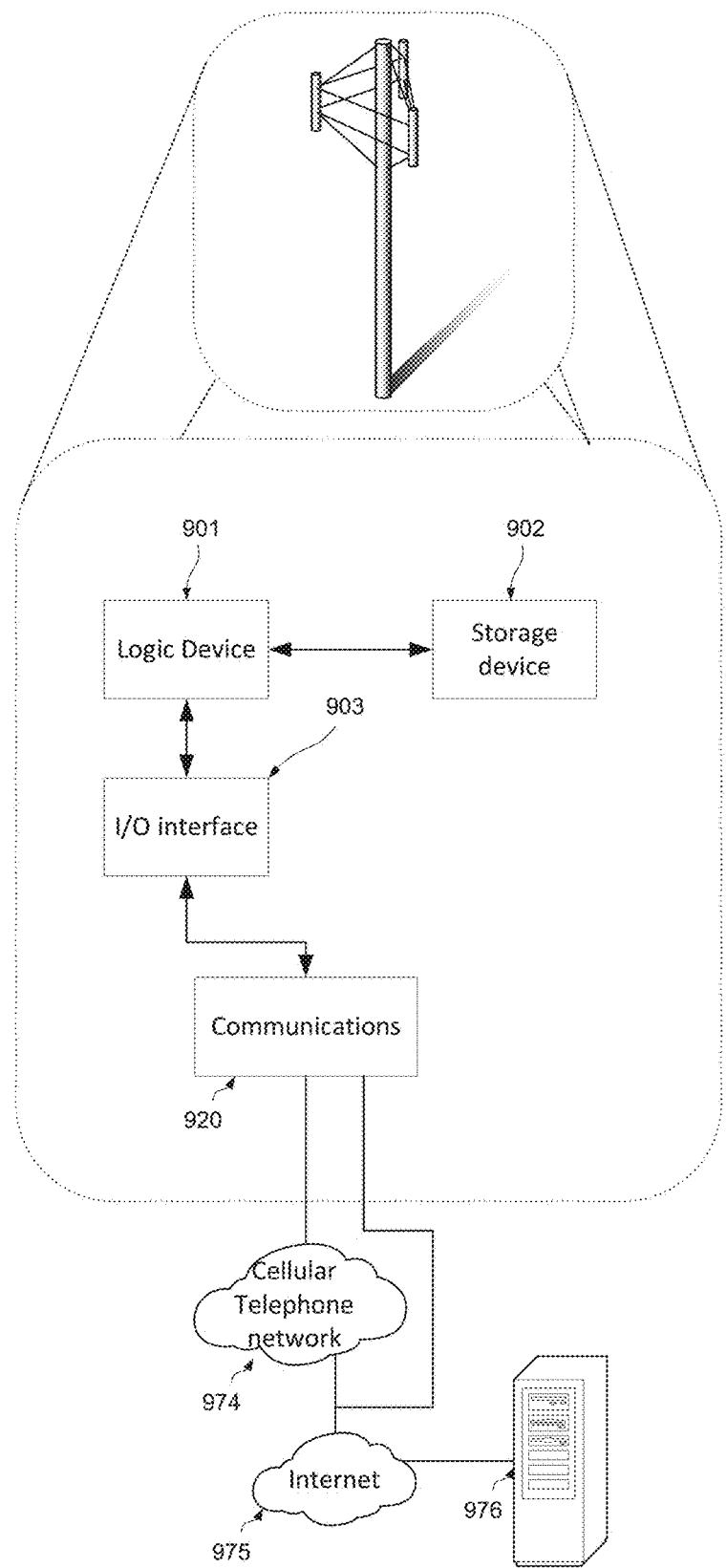
FIG. 11 shows a cellular network base station adaptable to constitute an embodiment.

FIG. 11 shows a cellular network base station adaptable to constitute an embodiment. As shown in FIG. 11, the cellular network base station incorporates elements 901, 902, 903, 920, as described above. It is in communication with the telephone network 974 and a server 976 via the network 975.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A Filter Bank Multicarrier frequency spread receiver for decoding a signal, said Filter Bank Multicarrier frequency spread receiver comprising a linear phase rotation module adapted to introduce a linear phase rotation to a time domain signal, a Discrete Fourier Transform unit, and a Finite Impulse Response digital filter, wherein coefficients of said Finite Impulse Response digital filter define a shift of a frequency response of a prototype filter of said Filter Bank Multicarrier frequency spread receiver, and wherein said introduced linear phase rotation is compensated by the frequency shift of said Finite Impulse Response digital filter wherein said frequency shift is equal to a reciprocal of a power of two or modulation sub carrier spacing.

2. The Filter Bank Multicarrier frequency spread receiver according to claim 1, wherein the coefficients of said Finite Impulse Response digital filter are truncated to include a minimal number of coefficients sufficient to achieve a desired Signal to Interference ratio.

3. The Filter Bank Multicarrier frequency spread receiver according to claim 1, wherein said frequency shift is equal to half the modulation sub carrier spacing.

4. The Filter Bank Multicarrier frequency spread receiver according to claim 1 where said Finite Impulse Response digital filter has fewer coefficients than the frequency response of said prototype filter.

5. The Filter Bank Multicarrier frequency spread receiver according to claim 1, wherein the filter-bank impulse response of the prototype filter satisfies the Nyquist criterion.

6. The Filter Bank Multicarrier frequency spread receiver according to claim 1, wherein said prototype filter is one of a quadrature mirror filter (QMF) filter, a time-frequency localization 1 (TFL1) filter, or an isotropic orthogonal transform algorithm (IOTA) filter.

7. The Filter Bank Multicarrier frequency spread receiver in accordance with claim 1 comprising a linear phase rotation module, a discrete Fourier transform unit, and a Finite Impulse response digital filter in a first group, and a further linear phase rotation module, a further discrete Fourier transform unit and a further Finite Impulse response digital filter in a second group, wherein said first group and second group are configured to process a first signal stream and a second signal stream respectively in parallel, wherein said first signal stream and said second signal stream are orthogonal to each other.

8. The Filter Bank Multicarrier frequency spread receiver of claim 7 wherein said first signal stream and said second signal stream constitute an orthogonal frequency division multiplexing signal.

9. The Filter Bank Multicarrier frequency spread receiver of claim 7 wherein said first signal stream and said second signal stream constitute a Filter Bank Multicarrier signal.

10. A method of defining a filter for a digital radio receiver, said method comprising defining a prototype filter, obtaining a frequency shifted version of said prototype filter, wherein said frequency shift is equal to a reciprocal of a power of two of modulation sub carrier spacing, and truncating coefficients defining said frequency shifted version of said prototype filter to a minimum number of coefficients enabling said frequency shifted version of said prototype filter to achieve a predefined Signal to Noise level.

11. A computer program product having computing instructions stored on a non-transitory medium for implementing the method of claim 10.

12. A method of decoding a Filter Bank Multicarrier encoded signal, said method comprising obtaining digital samples at a specified sampling rate, grouping said digital samples into groups of predetermined size, imposing a frequency shift equal to a reciprocal of a power of two of modulation sub carrier spacing on said groups, transforming the time-domain frequency shifted and grouped digital samples to the frequency domain, and filtering the frequency domain shifted values to compensate said frequency shift.

13. A computer program product having computing instructions stored on a non-transitory medium for implementing the method of claim 12.

* * * * *